(12) United States Patent
Suita

(10) Patent No.: US 7,896,378 B2
(45) Date of Patent: Mar. 1, 2011

(54) MOTORCYCLE

(75) Inventor: Yoshikazu Suita, Samutprakarn (TH)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 333 days.

(21) Appl. No.: 11/971,146

(22) Filed: Jan. 8, 2008

(65) Prior Publication Data

US 2008/0203698 A1    Aug. 28, 2008

Related U.S. Application Data

(60) Provisional application No. 60/892,202, filed on Feb. 28, 2007.

(51) Int. Cl.
*B62K 21/20* (2006.01)

(52) U.S. Cl. .......................... 280/276; 74/551.2

(58) Field of Classification Search ............ 280/276, 280/277, 279, 280; 74/551.1, 551.2, 551.3, 74/551.4
See application file for complete search history.

(56) References Cited

U.S. PATENT DOCUMENTS

| | | | | | |
|---|---|---|---|---|---|
| 1,051,773 | A | * | 1/1913 | Stevens | 74/551.2 |
| 2,294,839 | A | * | 9/1942 | Duffy | 74/551.2 |
| 2,583,947 | A | * | 1/1952 | Keetch | 74/551.2 |
| 6,325,402 | B1 | * | 12/2001 | Gogo et al. | 280/279 |
| 6,332,625 | B1 | * | 12/2001 | Fukunaga et al. | 280/280 |
| 7,121,568 | B2 | * | 10/2006 | Law | 280/280 |
| 7,540,516 | B2 | * | 6/2009 | Arnce | 280/276 |

FOREIGN PATENT DOCUMENTS

| | | | |
|---|---|---|---|
| CN | M245151 | | 10/2004 |
| JP | 40211485 | * | 1/1990 |
| JP | 4-38287 | * | 2/1992 |

* cited by examiner

*Primary Examiner*—Anne Marie M Boehler
(74) *Attorney, Agent, or Firm*—Keating & Bennett, LLP

(57) ABSTRACT

A motorcycle with reduced fatigue due to vibrations in travel. A handle bracket is connected to an upper end of a steering shaft through a damper member, and left and right handle bodies are fixed to left and right ends of the handle bracket.

7 Claims, 11 Drawing Sheets

MOTORCYCLE

RELATED APPLICATIONS

This application claims the benefit of priority under 35 USC 119(e) of U.S. provisional application No. 60/892,202, filed on Feb. 28, 2007, which application is hereby incorporated by reference in its entirety.

BACKGROUND OF THE INVENTION

1. Field of the Invention

The present invention relates to a motorcycle having a front fork journaled by a head pipe of a body frame and a steering handle mounted to an upper end of the front fork.

2. Description of Related Art

A motorcycle has been proposed in which a handle crown is fixed to a steering shaft of a front fork, and a handle divided into separate left and right sections is fixed to left and right ends of the handle crown. See, for example, Chinese Patent Specification No. M245151.

In this motorcycle, because the left and right separate handles are fixed directly to the handle crown, which is fixed to the steering shaft, there is a problem in that vibrations from the engine and body frame are liable to be transmitted to the left and right separate handles. Fatigue due to vibrations in travel is therefore liable to occur.

SUMMARY OF THE INVENTION

The present invention provides a motorcycle with reduced fatigue due to vibrations in travel.

A first embodiment of the invention is a motorcycle comprising a body frame, a front fork journaled by a head pipe of the body frame and journaling a front wheel at a lower end thereof, and a steering handle mounted to an upper end of the front fork. The front fork includes a steering shaft and left and right fork bodies connected to a lower end of the steering shaft through a fork bracket. A handle bracket is connected to an upper end of the steering shaft through a damper member. The steering handle includes separate left and right handle bodies that are fixed to left and right ends of the handle bracket.

With the motorcycle of the first embodiment, since the handle bracket is connected to the steering shaft through the damper member and the handle bodies are fixed to the handle bracket, vibrations from the engine and body frame are absorbed by the damper member and not transmitted to the handle bodies. Fatigue due to vibrations in travel is thereby reduced.

In one implementation, the handle bracket includes a lower bracket fixed to the steering shaft and an upper bracket fixed to the lower bracket through damper members. The left and right handle bodies are fixed to left and right ends of the upper bracket.

According to this implementation, since the lower bracket is fixed to the steering shaft and the damper members are interposed between the lower bracket and the upper bracket, to which the handle bodies are fixed, the lower bracket is surely fixed to the steering shaft. Accordingly, the steering handle is mounted to the body frame with a feeling of stiffness while inhibiting transmission of vibrations. Responsibility at the time of handle manipulation is thereby ensured.

In a further implementation, the damper members are arranged on left and right sides with a portion of the handle bracket fixed to the steering shaft interposed therebetween.

According to the implementation, since the damper members are arranged on left and right sides with a portion of the handle bracket fixed to the steering shaft interposed therebetween, a feeling of stiffness with which the steering handle is supported on the body frame is made further sure. By contrast, if the damper member were arranged on a region where the handle bracket and steering shaft are fixed, the handle bracket would be liable to fluctuate about the fixed region and would decrease the feeling of stiffness of the steering handle on the steering shaft.

In a further implementation, the left and right handle bodies are fixed to the handle bracket by joint bolts.

According to this implementation, since the left and right handle bodies are fixed by joint bolts, the handle bodies are prevented from turning about portions which are fixed to the handle bracket, without the need for structure such as detent pins or the like. By contrast, in other configurations using a front fork having left and right fork bodies extending to an upper end of a steering shaft, in which handle bodies are mounted directly to upper ends of the fork bodies, and in which ring-shaped mount bosses formed on the handle bodies are fitted onto upper ends of the fork bodies and fixed by bolts, there is a need for a detent construction.

In a further implementation, the left and right handle bodies are fixed to left and right ends of the handle bracket with height adjustment spacers therebetween.

According to this implementation, the interposed spacers interpose permit ready adjustment of the handle level to conform to a rider's body.

In a further implementation, a steering-shaft cover is mounted to the upper end of the steering shaft and positioned below the handle bracket. The steering-shaft cover covers harness members extending downwardly of the steering shaft from a car-mount part around the steering handle, and a guide portion is cut out and formed on the steering-shaft cover to hold the harness members in a bundled state.

According to this implementation, the steering-shaft cover also functions as a part for harness bundling to surely guide harness members, and eliminates the need for an exclusive part for harness fixation. By contrast, in a so-called pine-needle type front fork having left and right fork bodies connected to a steering shaft through a fork bracket, there is no part on an upper end of the steering shaft that functions to bundle harness members. Thus, the harnesses are liable to become separated unless an exclusive part for harness fixation is added.

In a further implementation, the handle bracket includes a lower bracket fixed to the steering shaft and an upper bracket fixed to the lower bracket through a damper member by a fixation bolt that is coaxial with the steering shaft.

According to this implementation, since the fixation bolt is coaxial with the steering shaft, the center about which the steering handle fixed to the upper bracket turns agrees with the steering shaft, so that steering manipulation is transmitted to the front wheel without a feeling of physical disorder and maneuverability is improved.

A second embodiment of the invention is a motorcycle comprising a body frame, a front fork journaled by a head pipe of the body frame and journaling a front wheel at a lower end thereof, and a steering handle mounted to an upper end of the front fork. The front fork includes a steering shaft and left and right fork bodies connected to a lower end of the steering shaft through a fork bracket. A handle bracket is connected to an upper end of the steering shaft. The steering handle includes separate left and right handle bodies that are fixed to left and right ends of the handle bracket. A spacing between the fixed portions of the left and right handle bodies is larger than a spacing between the left and right fork bodies.

According to this second embodiment, since the spacing between fixed portions of the left and right handle bodies is larger than the spacing between the left and right fork bodies, the front fork and front wheel can be readily steered without increasing the handle manipulating force on the steering handle too much, and maneuverability is thereby improved.

In one implementation, the handle bracket includes a lower bracket fixed to the steering shaft and an upper bracket fixed to the lower bracket by a fixation bolt that is coaxial with the steering shaft.

According to the implementation, since the fixation bolt is coaxial with the steering shaft, the center about which the steering handle fixed to the upper bracket turns agrees with the steering shaft in the same manner as described above, so that steering manipulation is transmitted to the front wheel without a feeling of physical disorder and maneuverability is improved.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
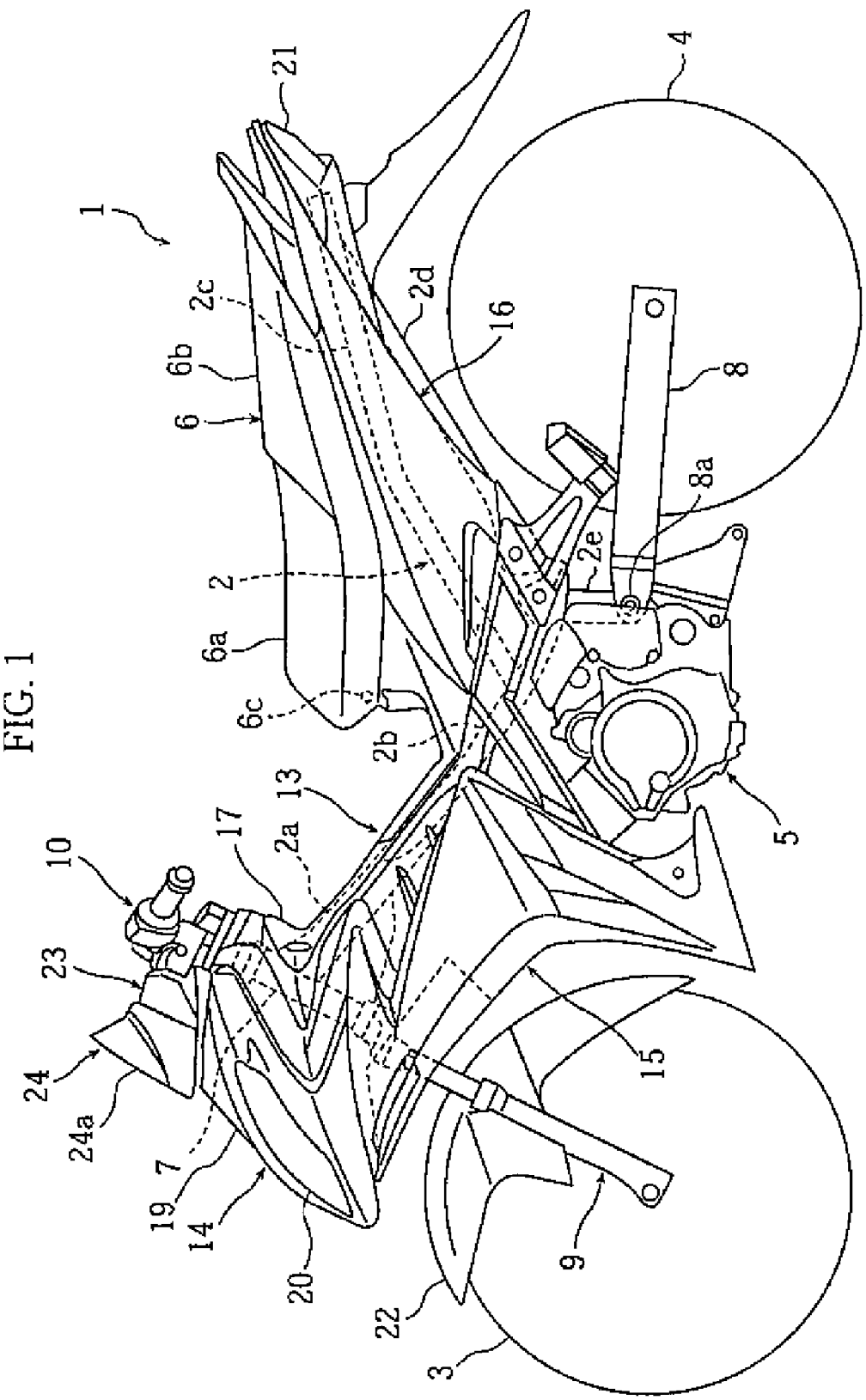
FIG. 1 is a side view of a motorcycle according to an embodiment of the invention.

An embodiment of the invention is now described with reference to the drawings. FIGS. 1-17 illustrate a motorcycle according to an embodiment of the invention. The front and rear, and left and right directions referred to in the are from the perspective of a rider seated on a seat.

In the drawings, reference numeral 1 denotes a motorcycle. Motorcycle 1 comprises an underbone type body frame 2, a front wheel 3 arranged at a front end of body frame 2, a rear wheel 4 arranged at a rear end thereof, an engine 5 mounted below body frame 2, and a saddle-type seat 6 mounted above body frame 2.

Body frame 2 includes a head pipe 7 positioned at its front end, a single main frame 2a extending rearward and obliquely downward from head pipe 7, left and right downtubes 2b, 2b contiguous to main frame 2a and extending rearward and obliquely downward while diverging outward in a vehicle width direction, left and right seat rails 2c, 2c extending rearward and obliquely upward from rear ends of downtubes 2b, 2b, and left and right seat stays 2d, 2d for connection of rear ends of seat rails 2c and rear ends of downtubes 2b.

A rear arm bracket 2e extends downward from the rear ends of downtubes 2b, 2b. A rear arm 8 is supported on rear arm bracket 2e through a pivot shaft 8a to be able to swing vertically and rear wheel 4 is journaled at a rear end of rear arm 8.

Seat 6 is mounted on seat rails 2c and includes a main seat 6a, on which a rider is seated, formed integrally with a tandem seat 6b, on which a tandem rider is seated. Seat 6 opens and closes vertically about a front hinge 6c. Arranged below seat 6 are a battery, a fuel tank and a storage box.

Engine 5 is a water-cooling type four-stroke engine and is suspended from and supported on downtubes 2b. Torque of engine 5 is transmitted to rear wheel 4 through a power transmission member such as chain.

Body frame 2 is covered by a body cover 13. Body cover 13 includes a front cover 14, which covers the front of head pipe 7, an inner cover 17, which covers the rear of head pipe 7, a leg shield 15, which covers the front of a rider's legs, and a side cover 16, which covers a lower periphery of seat 6.

Figure 17:
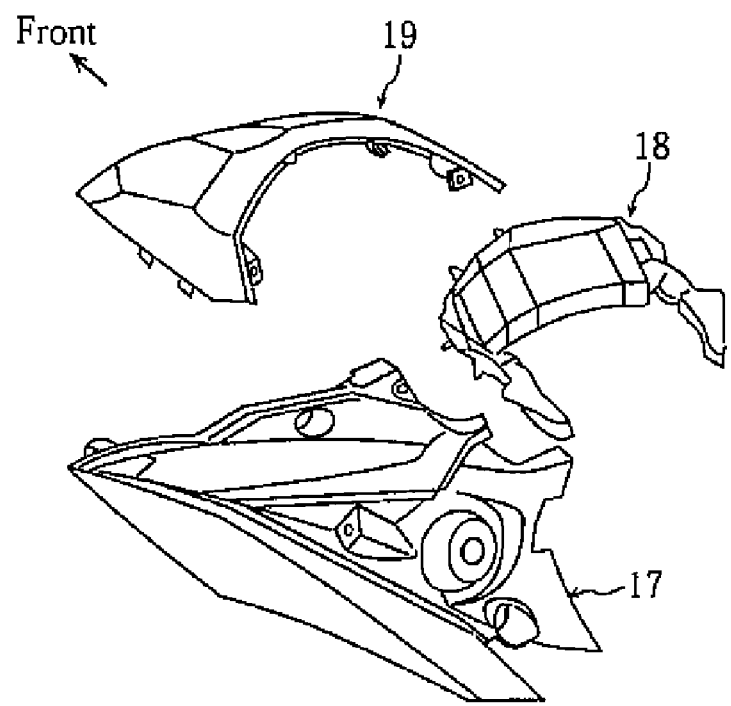
FIG. 17 is an exploded, perspective view of a cover arranged on the front fork.

A substantially triangular-shaped front lace 19 is mounted to an upper side of front cover 14 and a rubber cover 18 composed of an elastic member is mounted to a rear edge of front lace 19. Rubber cover 18 covers a handle escape hole of a steering handle 10 provided between front lace 19 and inner cover 17 (FIG. 17).

A headlight unit 20 is arranged on front cover 14 and a taillight unit 21 is arranged at a rear end of side cover 16.

Motorcycle 1 comprises a front fork 9 journaled by head pipe 7 and journaling front wheel 3 at a lower end thereof, and steering handle 10 mounted to an upper end of front fork 9.

A meter unit 23 is provided forwardly of steering handle 10 and includes a speedometer, a fuel reserve meter and a signal lamp. A meter cover 24 covers a front portion of meter unit 23. A visor 24a is formed on meter cover 24 to lead travel wind above a rider to relieve wind pressure. Visor 24a is inclined rearwardly upward to connect to front cover 14.

Front fork 9 is a so-called pine-needle type front fork and includes a steering shaft 9a and left and right fork bodies 9c, 9c connected and fixed to a lower end of steering shaft 9a through a fork bracket 9b. Front wheel 3 is journaled at lower ends of fork bodies 9c, 9c, and a front fender 22 mounted to fork bodies 9c covers an upper portion of front wheel 3.

Figure 2:
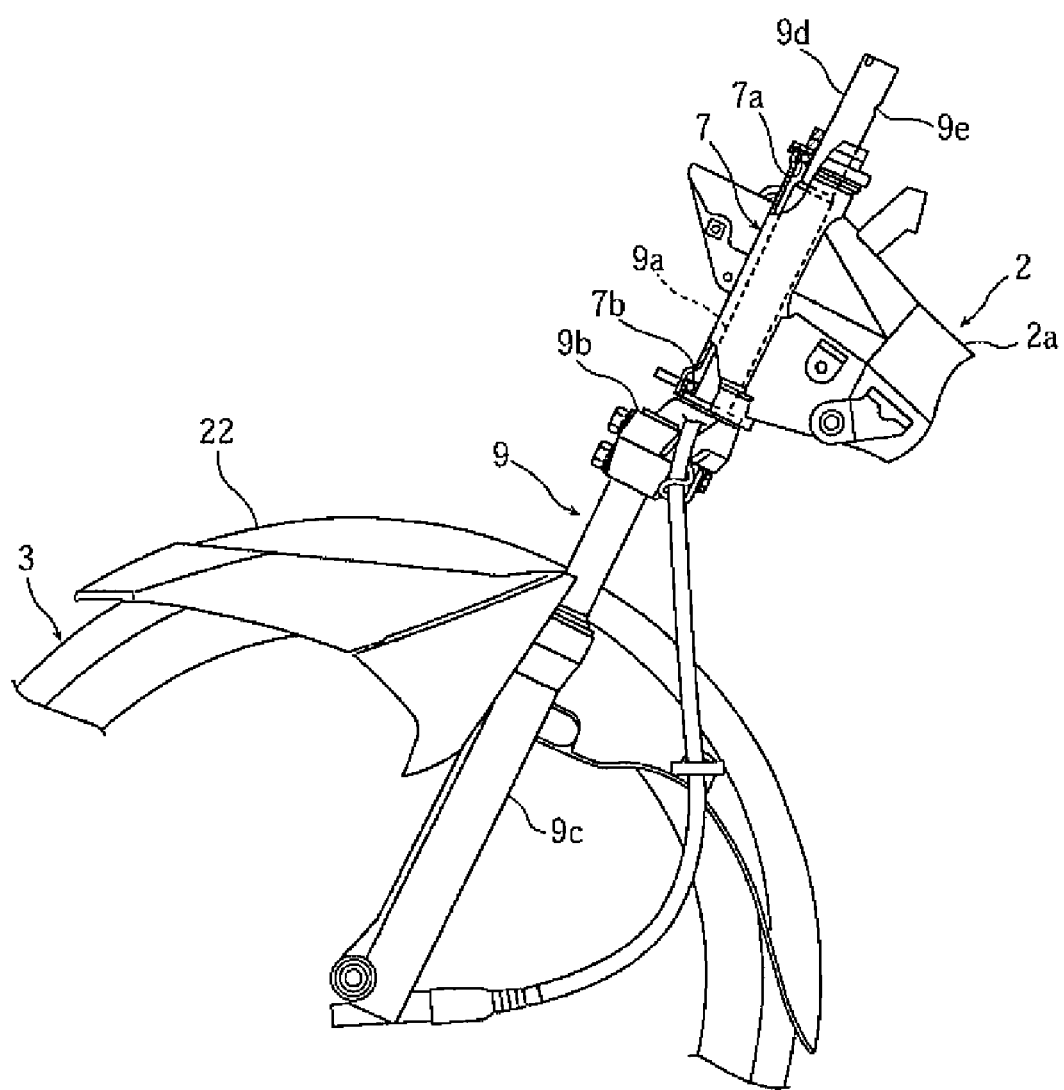
FIG. 2 is a side view of a front fork of the motorcycle.

Steering shaft 9a is supported through a pair of upper and lower bearings 7a, 7b arranged in head pipe 7 to enable steering left and right. An upper end 9d of steering shaft 9a projects upward from head pipe 7 (FIG. 2).

Steering handle 10 is mounted to upper end 9d of steering shaft 9a through a handle bracket 25. Handle bracket 25 includes a lower bracket 26 and an upper bracket 27. Lower bracket 26 is fixed to upper end 9d of steering shaft 9a, upper bracket 27 is fixed to lower bracket 26, and steering handle 10 is mounted to upper bracket 27.

Steering handle 10 includes left and right handle bodies 11, 11. Each handle body 11 comprises a handle lever 11a fixed to a base portion 11b. Base portions 11b are mounted to left and right ends 27e, 27e of upper bracket 27.

Lower bracket 26 includes a cylinder portion 26a, into which upper end 9d of steering shaft 9a is inserted, a band-shaped bracket body 26b fixed to an upper end of cylinder portion 26a and diverging forward in a substantially V-shaped manner, and a pair of left and right arm portions 26c, 26c projecting forward from bracket body 26b. Meter unit 23 is mounted to left and right arm portions 26c.

Cylinder portion 26a is formed with a fastening slit 26a' to fix a clamp member 26d thereto. Clamp member 26d projects rearward, and a bolt 26e is screwed into clamp member 26d in the vehicle width direction. An engagement recess 9e, with which bolt 26e engages, is cut out tangentially and formed at a rear edge of steering shaft 9a, and lower bracket 26 is fixed to steering shaft 9a by fastening bolt 26e (see FIGS. 6 and 7).

Figure 13:
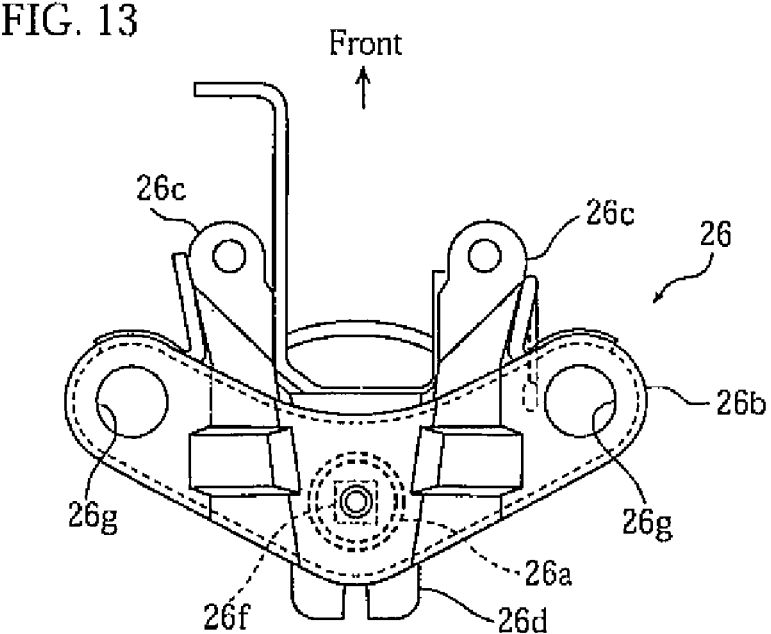
FIG. 13 is a plan view of a lower bracket of the handle bracket.
Figure 14:
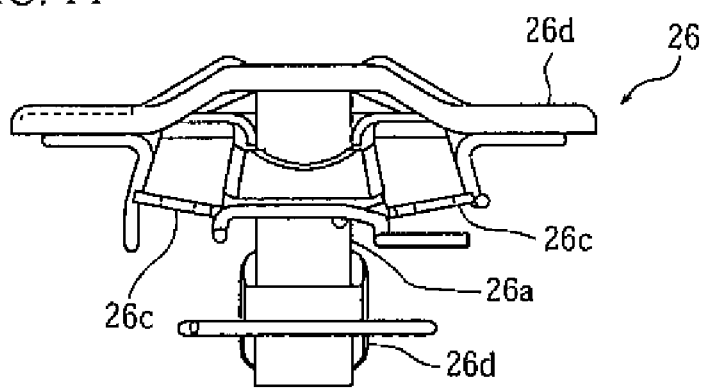
FIG. 14 is a front view of the lower bracket.
Figure 15:
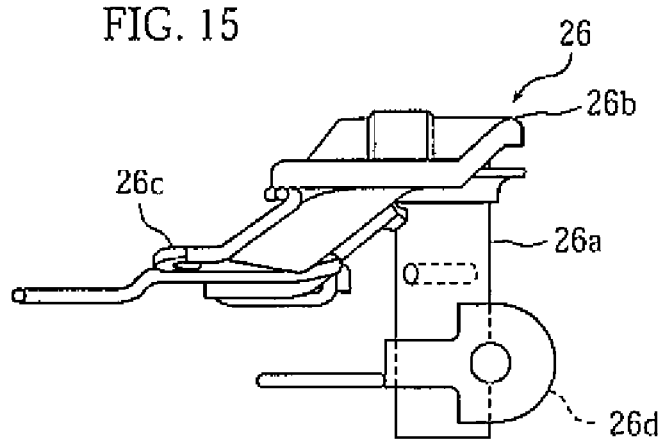
FIG. 15 is a side view of the lower bracket.

Bracket body 26b has damper mount holes 26g, 26g formed at its left and right ends. A nut 26f is fixed to an underside of a central portion of bracket body 26b in the vehicle width direction (FIG. 13).

Figure 10:
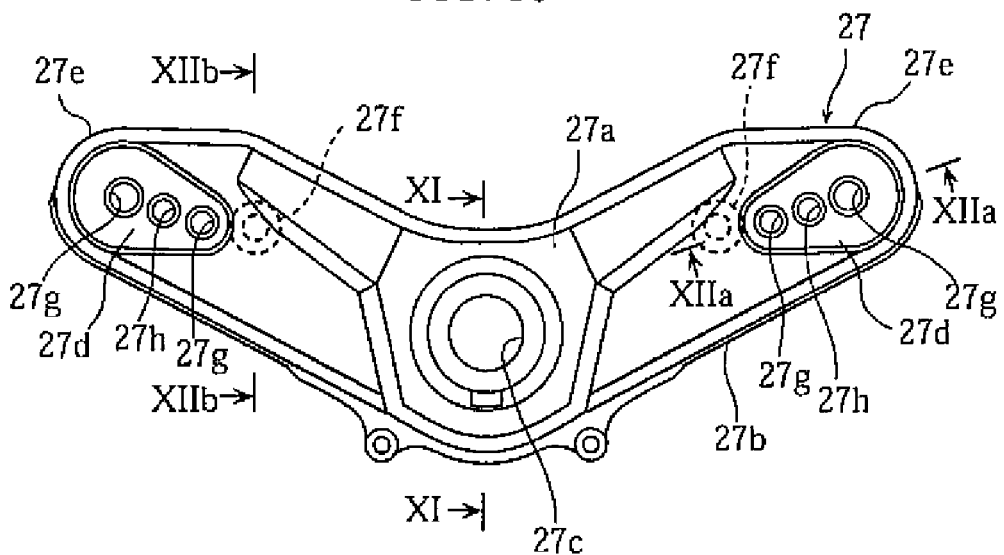
FIG. 10 is a plan view of an upper bracket of the handle bracket.
Figure 11:
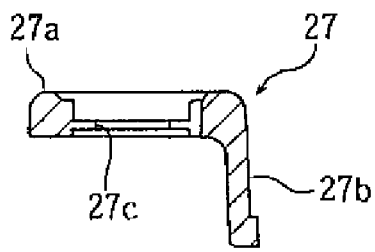
FIG. 11 is a cross sectional view of the upper bracket taken along line XI-XI of FIG. 10.
Figure 12:
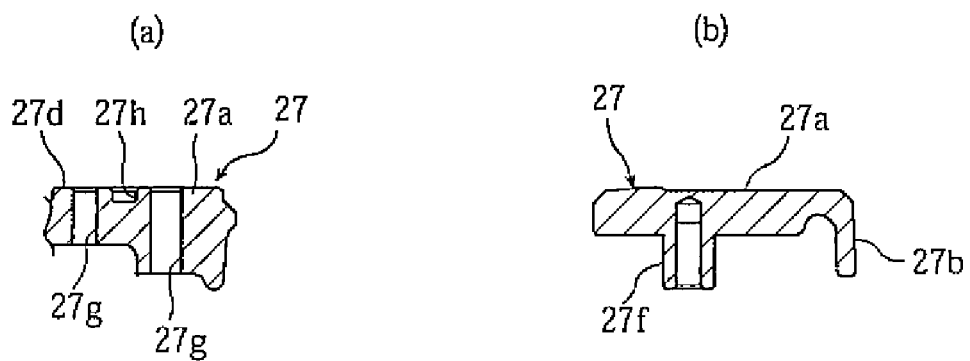
FIGS. 12(a) and 12(b) are cross sectional views of the upper bracket taken, respectively, along lines XIIa-XIIa and XIIb-XIIb of FIG. 10.

Upper bracket 27 is formed by die casting and includes a band-shaped bracket body 27a diverging forward in a substantially V-shaped manner. A longitudinal wall portion 27b extends downward from a rear edge of bracket body 27a. Bracket body 27a has a damper mount hole 27c formed in its central portion and handle mount seats 27d, 27d formed in its left and right ends 27e, 27e (FIG. 10). Downwardly extending left and right boss portions 27f, 27f are protrusively formed on an underside of bracket body 27a close to and inwardly of handle mount seats 27d, 27d.

Handle mount seats 27d are substantially egg-shaped and are larger in thickness than the remaining portion of bracket body 27a. A pair of bolt holes 27g, 27g are formed through each mount seat 27d, with a spacing in the vehicle width direction, and a positioning recess 27h formed therebetween.

Figure 8:
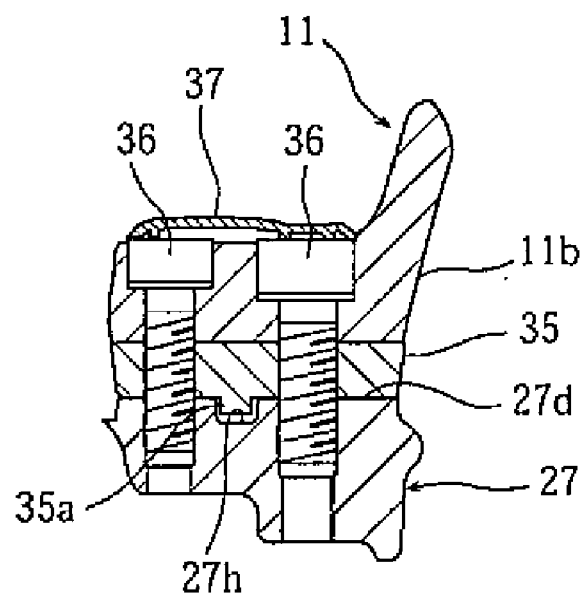
FIG. 8 is a cross sectional view of the handle bracket taken along line VIII-VIII of FIG. 5.
Figure 9:
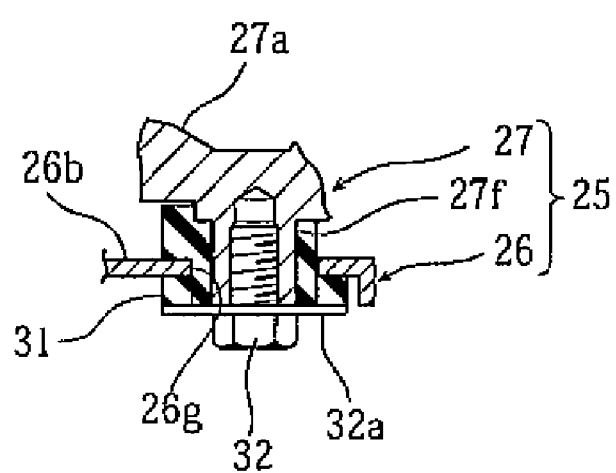
FIG. 9 is a cross sectional view of the handle bracket taken along line IX-IX of FIG. 6.

Height adjustment spacers 35 are arranged on mount seats 27d (FIG. 8). Projections 35a are formed on undersides of spacers 35 to engage with positioning recesses 27h.

Left and right handle bodies 11 are fixed detachably to left and right handle mount seats 27d of upper bracket 27 by two joint bolts 36, 36 inserted from above with spacers 35 therebetween. Caps 37 are mounted to base portions 11b to cover joint bolts 36.

Figure 4:
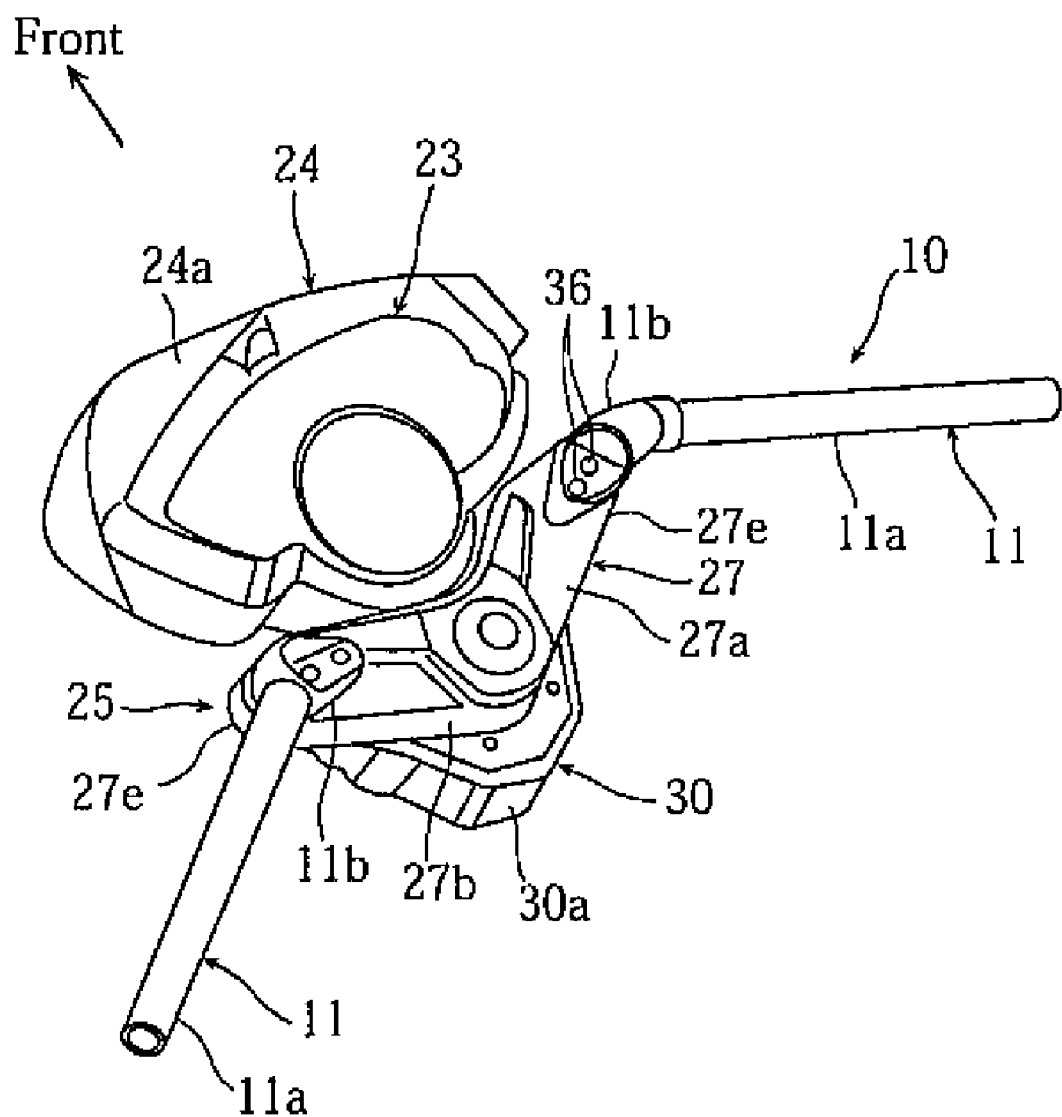
FIG. 4 is a perspective view of a steering handle fixed to the front fork.
Figure 5:
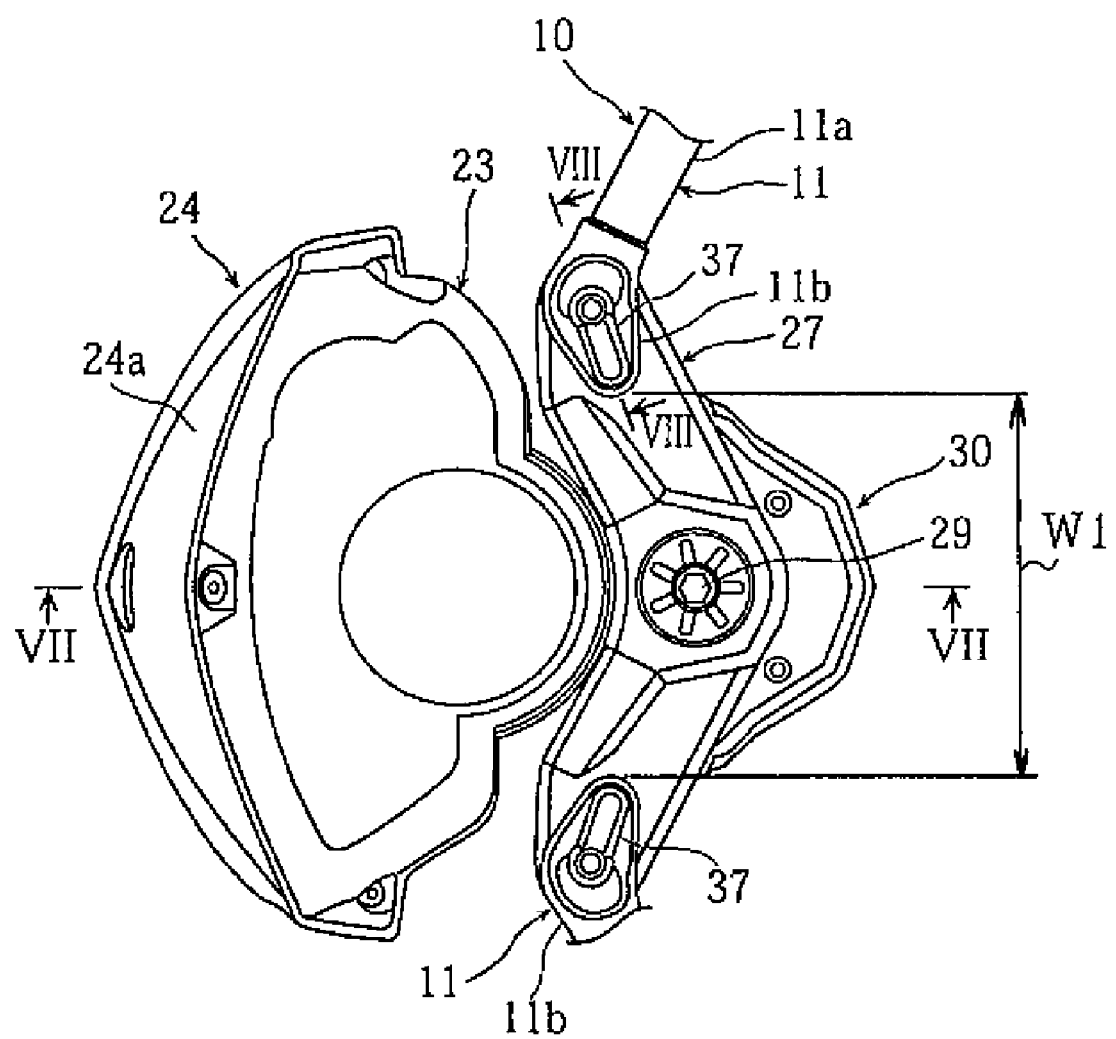
FIG. 5 is a plan view of a handle bracket of the front fork.
Figure 6:
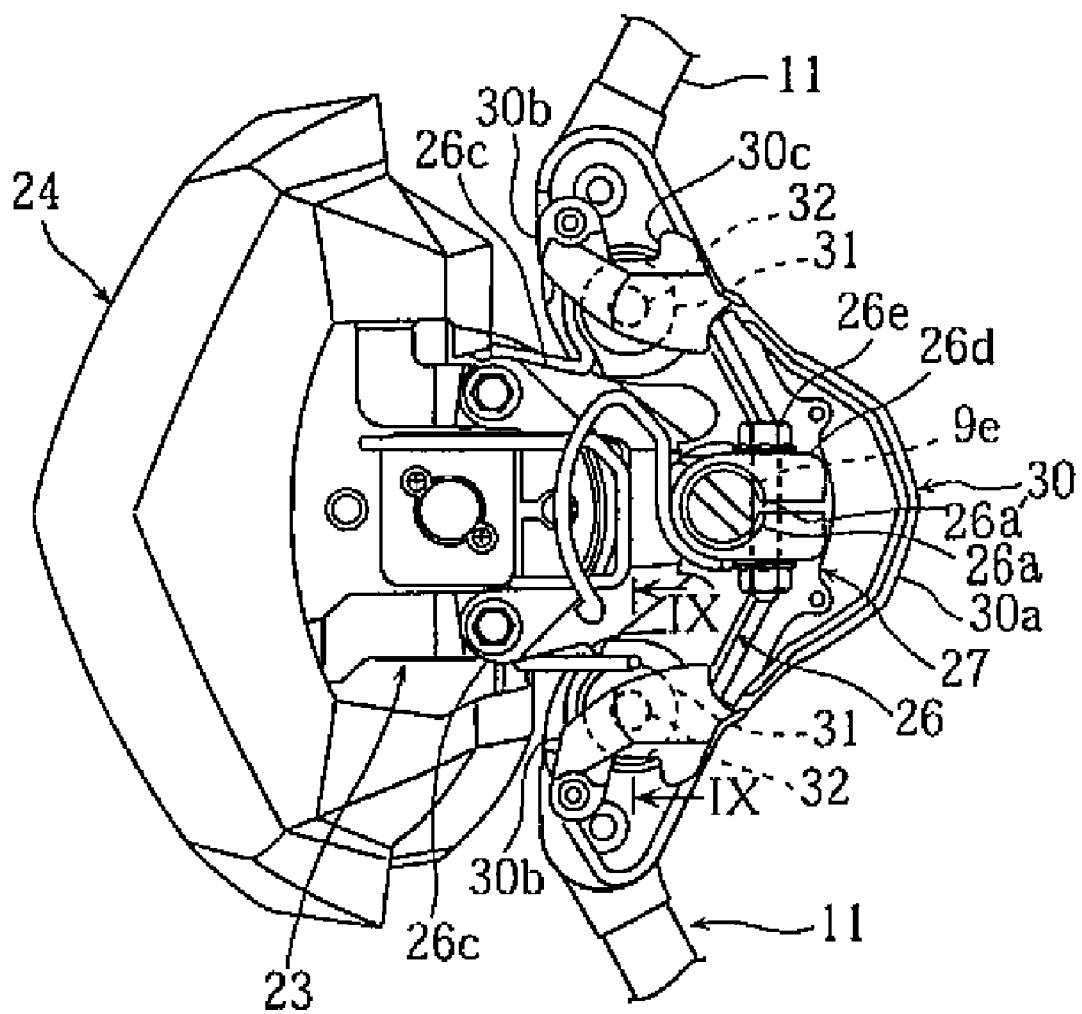
FIG. 6 is a bottom view of the handle bracket.
Figure 7:
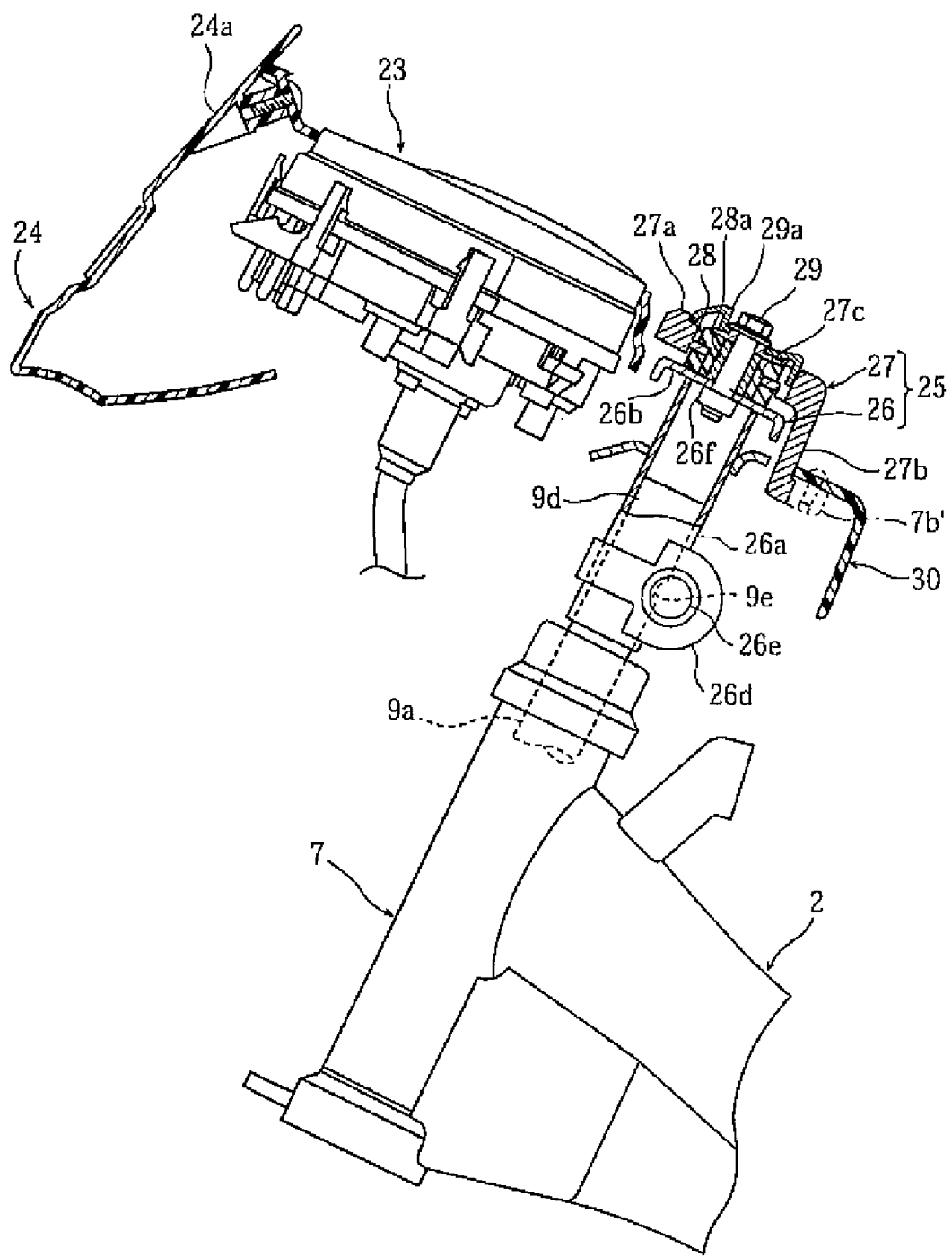
FIG. 7 is a cross sectional side view of the handle bracket of the front fork taken along line VII-VII of FIG. 5.
Figure 16:
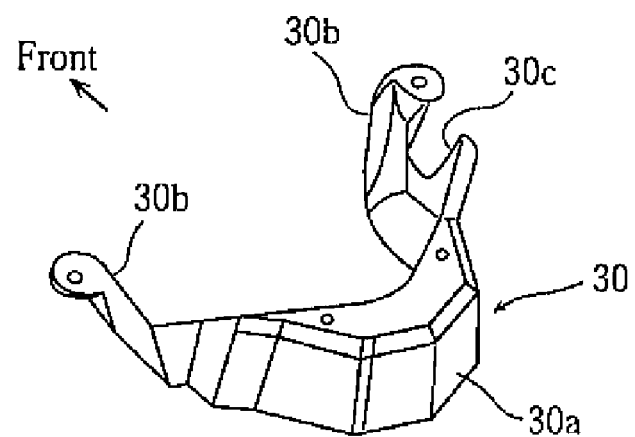
FIG. 16 is a perspective view of a steering-shaft cover mounted to the handle bracket.

A steering-shaft cover 30 is mounted to upper bracket 27 in a manner to be positioned at upper end 9d of steering shaft 9a below upper bracket 27 (FIGS. 4-6). Steering-shaft cover 30 includes a cover body 30a, which covers the rear of lower bracket 26 between upper bracket 27 and inner cover 17, and left and right mount pieces 30b, 30b extending forward from both ends of cover body 30a (FIG. 16). Mount pieces 30b are bolted and fixed detachably to an underside of upper bracket 27 and a front edge of cover body 30a is bolted and fixed detachably to lower edges 27b' of longitudinal wall portion 27b of upper bracket 27 (FIGS. 6 and 7).

Steering-shaft cover 30 covers a plurality of harness members (not shown) laid downward along steering shaft 9a from car-mount parts such as switches, operating buttons, etc. around steering handle 10. A guide portion 30c is cut out and formed on right mount piece 30b to hold the harness members in a bundled state (FIGS. 6 and 16).

A central portion of upper bracket 27 in the vehicle width direction is fixed to lower bracket 26 with a central damper member 28 therebetween. Damper member 28 is formed of an elastic member such as rubber or the like. Central damper member 28 is fitted into damper mount hole 27c of upper bracket 27, and a collar 28a is inserted into a shaft core of central damper member 28. By fastening a fixation bolt 29, which is inserted into collar 28a from above, to nut 26f of lower bracket 26, upper bracket 27 is fixed to lower bracket 26 with central damper member 28 therebetween (FIG. 7).

Fixation bolt 29 is arranged coaxially with a center line of steering shaft 9a. Fixation bolt 29 also mounts thereto a sealing cap 29a for sealing between fixation bolt 29 and a peripheral edge of damper mount hole 27c.

Left and right ends 27e, 27e of upper bracket 27 are fixed to lower bracket 26 with left and right damper members 31, 31 therebetween. Damper members 31 are formed of elastic members such as rubber or the like, Damper members 31 are fitted into left and right damper mount holes 26g of lower bracket 26, and boss portions 27f of upper bracket 27 are inserted axially into damper members 31. By fastening left and right fixation bolts 32, which are inserted into boss portions 27f from under, with washer members 32a therebetween, left and right ends 27e, 27e of upper bracket 27 are fixed to lower bracket 26 with damper members 31 therebetween (see FIG. 9). Handle bodies 11 are fixed in the vicinity of damper members 31.

Figure 3:
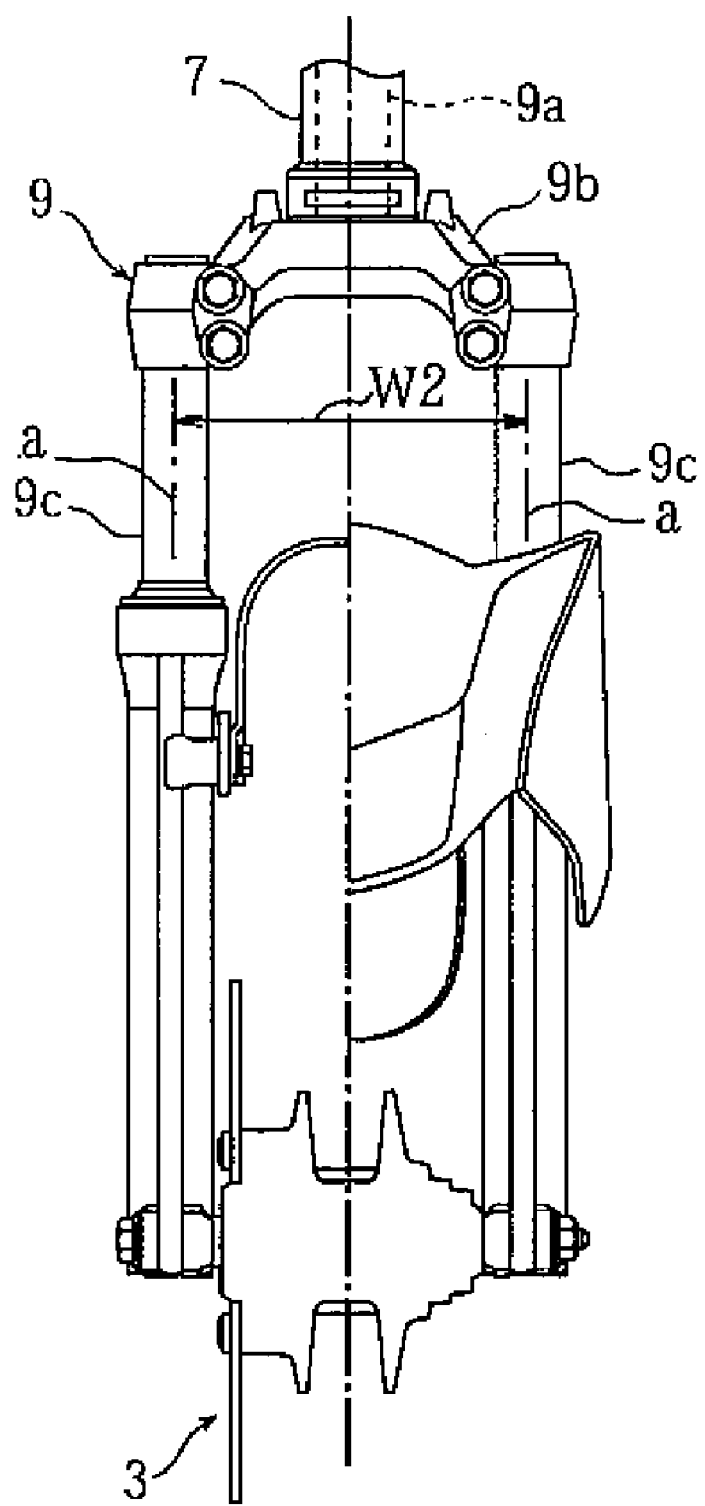
FIG. 3 is a front view of the front fork.

A spacing W1 between inner sides of base portions 11b of handle bodies 11, which are fixed to upper bracket 27 (FIG. 5), is larger than a spacing W2 between axes a, a of left and right fork bodies 9c, 9c (FIG. 3).

According to the embodiment, since handle bracket 25 is connected to steering shaft 9a with central damper member 28 and left and right damper members 31, 31 therebetween, and left and right handle bodies 11, 11 are fixed to handle bracket 25, vibrations from engine 5 and body frame 2 are absorbed by damper members 28 and 31 and are not transmitted to handle bodies 11. Fatigue due to vibrations in travel is thereby reduced.

According to the embodiment, since lower bracket 26 is fixed to steering shaft 9a, and damper members 28, 31 are interposed between lower bracket 26 and upper bracket 27, to which handle bodies 11 are fixed, steering handle 10 is mounted to body frame 2 with a feeling of stiffness while inhibiting transmission of vibrations, thereby ensuring responsibility at the time of handle manipulation.

According to the embodiment, because damper members 31 are arranged on left and right sides, with the portion of handle bracket 25 that is fixed to steering shaft 9a therebetween, a feeling of stiffness with which steering handle 10 is supported on body frame 2 is made further sure.

Also, since damper members 31 are arranged in the vicinity of handle bodies 11, vibrations are not transmitted to handle bodies 11.

According to the embodiment, since handle bodies 11 are fixed to upper bracket 27 by means of two joint bolts 36, handle bodies 11 are prevented from turning about portions thereof that are fixed to upper bracket 27 without the need for structures such as detent pins or the like. That is, in other configurations using a front fork having left and right fork bodies extending to an upper end of a steering shaft, in which handle bodies are mounted directly to upper ends of the fork bodies, and in which ring-shaped mount bosses formed on the handle bodies are fitted onto upper ends of the fork bodies and fixed by bolts, there is a need for a detent construction.

According to the embodiment, since handle bodies 11 are fixed to left and right ends 27e, 27e of upper bracket 27 with spacers 35 therebetween, a simple height adjustment of spacers 35 allows adjustment of the handle level to conform to a rider's body.

According to the embodiment, since steering-shaft cover 30 is positioned below upper bracket 27, steering-shaft cover 30 covers a plurality of harness members extending downward along steering shaft 9a from car-mount parts around steering handle 10, and guide portion 30c of steering-shaft cover 30 holds the harness members in a bundled state, steering-shaft cover 30 also functions as a part for harness bundling to surely guide harness members and eliminates the need for an exclusive part for harness fixation. By contrast, in a so-called pine-needle type front fork having left and right fork bodies connected to a steering shaft through a fork bracket, there is no part on an upper end of the steering shaft that functions to bundle harness members. Thus, the harnesses are liable to become separated unless an exclusive part for harness fixation is added.

Also, since the spacing W1 of the fixed portions of handle bodies 11 is larger than the spacing W2 of left and right fork bodies 9c, 9c, front fork 9 and front wheel 3 can be readily steered without increasing the handle manipulating force that a driver applies on steering handle 10 too much, so that quick switchback manipulation or the like is made easy and maneuverability on roads having a lot of curves is improved.

Also, since the spacing W1 of the portions of handle bodies 11 fixed to upper bracket 27 is large in width, upper bracket 27 and hence handle bracket 25 can be increased in dimension in the vehicle width direction, thus enabling an interior of handle bracket 25 or a space therebelow to be utilized as a space in which wire harness and auxiliaries are arranged.

According to the embodiment, damper members 28, 31 prevent or inhibit transmission of vibrations. In order to improve this capability, it is advantageous to make the damper members further soft. If made too soft, however, handle steering force is not efficiently transmitted to a front fork and may decrease maneuverability.

According to the embodiment, since handle bracket 25 is large in width and handle bodies 11 are arranged as far outside as possible, the force required for sustaining a rotational moment about the steering shaft can be small, which allows use of softer damper members to improve vibration proof capability.

Also, since fixation bolt 29, by which upper bracket 27 is fixed to steering shaft 9a through lower bracket 26, is arranged coaxially with steering shaft 9a, the center about which steering handle 10 fixed to upper bracket 27 turns agrees with steering shaft 9a, so that steering manipulation is transmitted to front wheel 3 without a feeling of physical disorder and maneuverability is improved.

Furthermore, since fixation bolt 29 is arranged coaxially with steering shaft 9a, the interior of handle bracket 25 or a space therebelow can be efficiently used as a space in which wire harness and auxiliaries are arranged.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
a body frame;
a front fork journaled by a head pipe of the body frame and journaling a front wheel at a lower end thereof; and
a steering handle mounted to an upper end of the front fork; wherein
the front fork includes a steering shaft and left and right fork bodies connected to a lower end of the steering shaft through a fork bracket;
a handle bracket is connected to an upper end of the steering shaft through a damper member;
the steering handle includes separate left and right handle bodies that are fixed to left and right ends of the handle bracket;
the handle bracket includes a lower bracket fixed to the steering shaft and an upper bracket fixed to the lower bracket through a first damper member by a fixation bolt that is coaxial with the steering shaft;
the lower bracket includes a bracket body and a cylindrical portion extending downwardly from a lower surface of the bracket body; and
the upper end of the steering shaft extends upwardly from the head pipe into the cylindrical portion of the lower bracket and is fixed to the cylindrical portion of the lower bracket below the lower surface of the bracket body.

2. The motorcycle according to claim 1, wherein the upper bracket is fixed to the lower bracket through a plurality of damper members, and wherein the left and right handle bodies are fixed to left and right ends of the upper bracket.

3. The motorcycle according to claim 2, wherein second and third damper members of the plurality of damper members are arranged on left and right sides of the handle bracket.

4. The motorcycle according to claim 1, wherein the left and right handle bodies are fixed to the handle bracket by joint bolts.

5. The motorcycle according to claim 1, wherein the left and right handle bodies are fixed to left and right ends of the handle bracket with height adjustment spacers therebetween.

6. The motorcycle according to claim 1, wherein a steering-shaft cover is mounted to the upper end of the steering shaft and positioned below the handle bracket, and covers harness members extending downwardly of the steering shaft from a car-mount part around the steering handle, and a guide portion is cut out and formed on the steering-shaft cover to hold the harness members in a bundled state.

7. A motorcycle comprising:
a body frame;
a front fork journaled by a head pipe of the body frame and journaling a front wheel at a lower end thereof; and
a steering handle mounted to an upper end of the front fork; wherein
the front fork includes a steering shaft and left and right fork bodies connected to a lower end of the steering shaft through a fork bracket;
a handle bracket is connected to an upper end of the steering shaft;
the steering handle includes separate left and right handle bodies that are fixed to left and right ends of the handle bracket, wherein a spacing between fixed portions of the left and right handle bodies is larger than a spacing between the left and right fork bodies; and
the handle bracket includes a lower bracket fixed to the steering shaft and an upper bracket fixed to the lower bracket by a fixation bolt that is coaxial with the steering shaft;
the lower bracket includes a bracket body and a cylindrical portion extending downwardly from a lower surface of the bracket body; and
the upper end of the steering shaft extends upwardly from the head pipe into the cylindrical portion of the lower bracket and is fixed to the cylindrical portion of the lower bracket below the lower surface of the bracket body.

\* \* \* \* \*